United States Patent [19]

Gothe et al.

[11] 4,204,427

[45] May 27, 1980

[54] DEVICE FOR THE CAPACITIVE LEVEL HEIGHT MEASUREMENT OF LIQUIDS OR SOLIDS

[75] Inventors: Diethard Gothe, North Eltham; Jeffrey J. Nuske, Diamond Creek; Jürgen G. Friedrich, Ringwood, all of Australia

[73] Assignee: VDO Adolf Schindling AG, Frankfurt am Main, Fed. Rep. of Germany

[21] Appl. No.: 929,531

[22] Filed: Jul. 31, 1978

[30] Foreign Application Priority Data

Jun. 2, 1978 [DE] Fed. Rep. of Germany ....... 2824144

[51] Int. Cl.² .................. G01F 23/26; G01R 27/26
[52] U.S. Cl. .............................. 73/304 C; 324/65 P; 361/284
[58] Field of Search ................... 73/304 C, 313; 324/61 P; 361/284

[56] References Cited

U.S. PATENT DOCUMENTS

| 2,998,559 | 8/1961 | Smith | 361/284 |
|---|---|---|---|
| 3,025,201 | 3/1962 | Ponemon | 361/284 X |
| 3,986,110 | 10/1976 | Overall et al. | 324/61 P X |
| 4,016,490 | 4/1977 | Weckenmann et al. | 324/61 P X |
| 4,025,846 | 5/1977 | Franz | 324/61 P |
| 4,038,871 | 8/1977 | Edwards | 73/304 C |

*Primary Examiner*—Daniel M. Yasich
*Attorney, Agent, or Firm*—Martin A. Farber

[57] ABSTRACT

A device for the capacitive level height measurement of liquids in motor vehicle tanks, with a measuring sensor with at least two electrodes which are arranged axially parallel to each other and a carrier, and an evaluation circuit containing an oscillator, with the measuring sensor and an indicator instrument being connected to the evaluation circuit. One electrode is made of an electrically conducting layer which is disposed on the elongated insulating material plate and the other electrode is formed in the shape of a U-shaped elongated metal carrier; on the legs of the carrier there is fastened the insulating material plate contacting another conducting layer in the insulating material plate, and the evaluation circuit is constructed in microelectronic technology, is electrically connected to the conducting layers, and is fastened on that part of the measuring sensor which projects from the liquid or solid, respectively.

10 Claims, 5 Drawing Figures

FIG. 2
FIG. 4
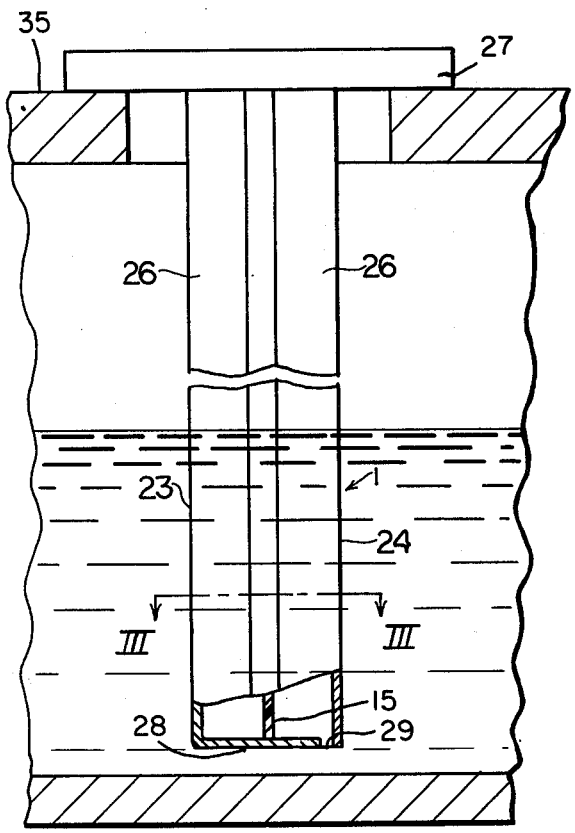
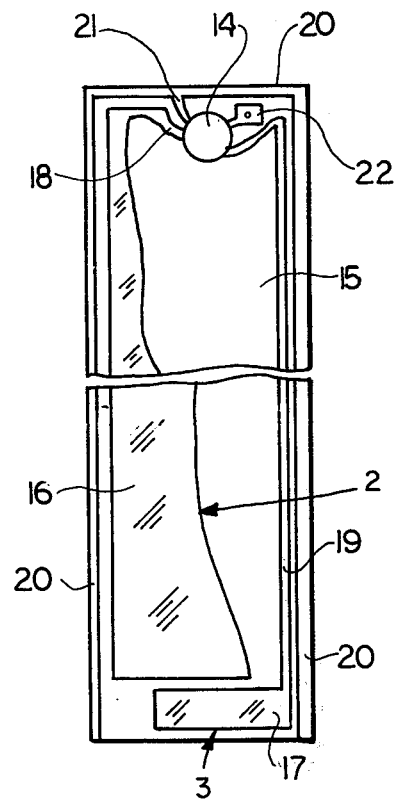
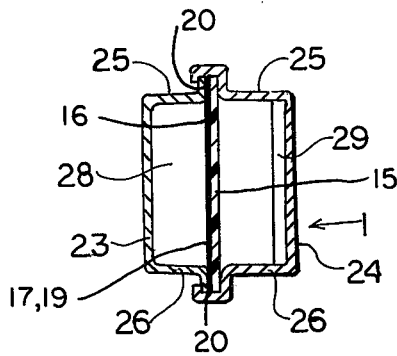
FIG. 3
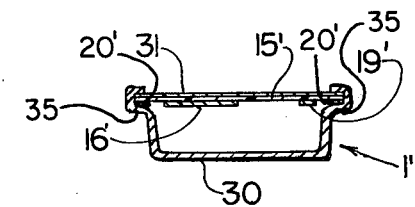
FIG. 5

DEVICE FOR THE CAPACITIVE LEVEL HEIGHT MEASUREMENT OF LIQUIDS OR SOLIDS

The invention relates to a device for the capacitive level height measurement of liquids in motor vehicle tanks, with a measuring sensor with at least two electrodes which are arranged axially parallel to each other, which electrodes are fastened on a carrier, and an evaluation circuit containing an oscillator, with the measuring sensor and an indicator instrument being connected to the evaluation circuit.

In one known device of this type, both of the measuring electrodes are coaxially arranged with respect to one another, whereby the inner electrode is rod-shaped and the outer electrode is formed tubular-like. With this device the adjustment or adaptation of the characteristic curve of the measuring sensor to different container forms can take place by corresponding enlargement or reduction of the diameter of the rod-shaped and/or of the tube-shaped electrodes, and respectively, by application of an axially longitudinal slot of different widths in the tube-like electrode. Such an adjustability however has considerable manufacturing disadvantages. Such devices are thus not suited for large series or mass production manufacturing.

Moreover a capacitive level measurement device is known where the two electrodes are applied in the form of two strips, which engage comb-like in one another on an insulating material carrier. These measuring sensors without difficulties, merely by change of the strip lengths, may be adjusted to different container or tank shapes. However such a device is disadvantageous in that the measuring sensor is sensitive toward electrical field disturbances and moreover acts as sending antenna for the oscillations transmitted by the oscillator; consequently it is particularly not usable for level height measurements in motor vehicles.

It is an object of the present invention to provide a device of the introductory-mentioned type which avoids the above-mentioned disadvantages.

It is another object of the present invention to create a device which can be produced cheaply in large numbers of pieces and also which is protected or screened-off against an outer electrical field disturbance as well as with respect to a radiation of the high frequency electric field which exists between the electrodes.

It is another object of the present invention, starting out from a device of the introductory-mentioned type, to aid the solution of the above-mentioned objects in the manner that at least one electrode (16, 17) is made of an electrically conducting layer which is disposed on the elongated insulating material plate (15, or 15') and the other electrode is formed in the shape of at least one U-shaped elongated metal carrier (23 and 24 or 30); on the carrier there is fastened the insulating material plate (15, or 15') and the evaluation circuit component (4) is constructed in hybrid- or microelectronic technology and is fastened on that part of the measuring sensor (1 or 1') which projects from the liquid or solid, respectively; the vicinity of the edges of the material plate is formed with another conducting layer contacting the metal carrier and the evaluating circuit component is electrically connected to the conducting layers, respectively.

By the combination of these measures, a device is obtained, which in a particularly high measure is suited for large series or mass production and consequently for use in motor vehicles. The formation of the two electrodes and their coordination to one another leads to a measuring sensor which is favorable in manufacture and easily adjustable to different container or tank shapes, which measuring sensor beyond that has a high inherent stability. A particular advantage of this measuring sensor is that it can be adjusted without tools with respect to its characteristic curve and easily by plastic deformation of the electrode serving as the carrier. Such an adjustment, which previously could be undertaken only in the evaluation circuit, now offers the capability to form the entire evaluation circuit in fixed or set microelectronic technology since adjustable elements for the calibration in the evaluation circuit are no longer required. The evaluation circuit which is formed in microelectronic technology itself can be accommodated on a substrate wafer or platelet of merely a few square millimeters and this wafer or platelet itself can be accommodated in the measuring sensor. This not only leads to a device of particularly small constructional volume and weight, but rather also beyond that brings the advantage that the cabling is essentially simplified insofar as the line which leads out from the measuring sensor and which goes to the indicator instrument, to the contrary of the known devices, is applied with a DC current, and accordingly, this line does not need to be protected as a high frequency line.

It has proven particularly advantageous that the evaluation circuit (4) formed in microelectronic technology is arranged on that side of the insulating material plate (15, or 15') which carries the electrode(s) (16, 17). In this manner the electrical connections between the evaluation circuit and the electrodes are held particularly short. Also then, the number of the lines, which must be led out from the measuring sensor, is particularly small; in case the measuring sensor has a metallic holder, for example a metallic flange, on which the carrier there is fastened, which carrier carries the insulating material plate, merely one single-core line leads out from the measuring sensor, which naturally results in less problems with respect to sealing against liquid and gas penetration, respectively, than is the case with a multiple-polar line or guide-through.

According to an advantageous embodiment of the invention, the electrodes (16, 17) on the insulating material plate (15, or 15') and the feed lines (18, 19) leading to the electrodes, are part of a metal layer or foil which is etched out and disposed on the insulating material plate (15, or 15'). The electrodes and the feed lines which are connected with these electrodes each form a one-piece unit. In this manner the production expense may be reduced substantially. If the free ends of the feed lines moreover are arranged such that the evaluation circuit can get in contact directly with these ends upon the fastening of the evaluation circuit to the insulating material plate, then a particularly advantageous manufacturing connection of the evaluation circuit and the electrodes results.

In case the medium to be measured permits the same, for the insulating material plate with the metal layer or foil disposed thereon, ordinary copper-layered conductor plates can be used, from which in a known manner then the electrodes and their feed lines can be obtained by etching out the unneeded copper layer.

According to another embodiment of the invention, the electrode which serves as the carrier is made of one sheet metal strip (30) in the shape of a U-profile, the free leg ends of which pass or transfer into a flanging engaging around the edge of the insulating material plate. In order to obtain an unobjectionable protection against radiation disturbance with such an embodiment, the use of an insulating material plate with a metal layer or foil arranged on both sides is recommended, from which merely on the side which faces the sheet metal strip, the electrodes and the feed lines are etched out. The other metal layer, which faces away from the sheet metal strip, then together with the sheet metal strip, serves as a protection screen.

With another advantageous embodiment of the invention, the electrode which serves as the carrier comprises two sheet metal strips (23, 24) in the shape of U-profiles, the free leg ends (25, 26) of which are connected with one another, receiving therebetween the insulating material plate (15). With this embodiment a conductor plate can be used which is provided merely on one side with a metal layer. This embodiment, with respect to the previously described embodiment, has the advantage of an essentially higher inherent stability; consequently it is particularly suited for use in motor vehicles.

The electrical connection of the sheet metal strip or strips, respectively, serving as the electrode, with the evaluation circuit and, respectively, with one another takes place in the most advantageous manner in that the insulating material plate (15, or 15') in the vicinity of its edges has at least one conducting layer (20), respectively, contacting at least one sheet metal strip (23 and 24; or 30), which at least one conducting layer extends into a line (21) connected to the evaluation circuit. This conducting layer and the line standing in connection with it can be etched out from the metal layer lining in the same working step in which also the electrodes and its feed lines are produced. For damping of the liquid movements on the measuring sensor which liquid movements occur particularly with a traveling motor vehicle, conventionally which lead to a non-resting or fluctuating indication, according to an advantageous embodiment of the invention at least one sheet metal strip (23 and 24; or 30) on a bottom end thereof which is immersed in a medium to be measured has a right-angled bent-off tab substantially closing the space formed by the insulating material plate (15, or 15') and the sheet metal strip or sheet metal strips, respectively (23 and 24; or 30) leaving a small opening communicating with the liquid to be measured.

The measuring space formed between the insulating material plate and the sheet metal strip or strips is thus divided or separated from the remainder of the interior of the tank by means of a throttle opening which is formed by the flap, such that liquid movements which occur in the interior of the tank which holds the liquid to be measured do not, or only when considerably reduced, transfer into the measuring space.

It has been noted that the dielectric constant of various common gasolines is not constant, but has different values. To eliminate indication differences that are based thereon, in addition to both of the measuring electrodes, a reference electrode (17) is provided, which reference electrode according to an advantageous embodiment of the invention constitutes a further conducting layer on the insulating material plate (15, or 15'). This reference electrode together with the opposite part thereto of the metallic carrier or sheet metal strip, respectively, forms a reference capacitor. The evaluation of the emitted signals of the measuring electrodes and the reference electrode results with special advantage therefrom in the manner that the measuring sensor capacitor (2) and the reference capacitor (3) are connected in parallel to the output of the oscillator (6) and each capacitor (2, 3) is connected each by means of one rectifier (11, 12), respectively, with one input of the differential amplifier (13), respectively, which input is coordinated thereto, and a quotient measuring element (5) is connected to the output of the differential amplifier. Such an evaluation circuit has a construction having few components and furthermore an inexpensive oscillator of a low frequency constant can be used, since frequency variations of the oscillator do not enter into the measuring result.

With the above and other objects and advantages in view, the present invention will become more clearly understood in connection with the following detailed description of two preferred embodiments, when considered with the accompanying drawings, of which:

FIG. 2 is a side view of the measuring sensor partly in section;

FIG. 3 is a cross-section through the measuring sensor taken along the lines III—III according to FIG. 2;

FIG. 4 is a top view of the insulating material plate of the measuring sensor according to FIG. 2, which insulating material plate carries the electrodes; and FIG. 5 is a cross-section through another measuring sensor of the device.

Figure 1:
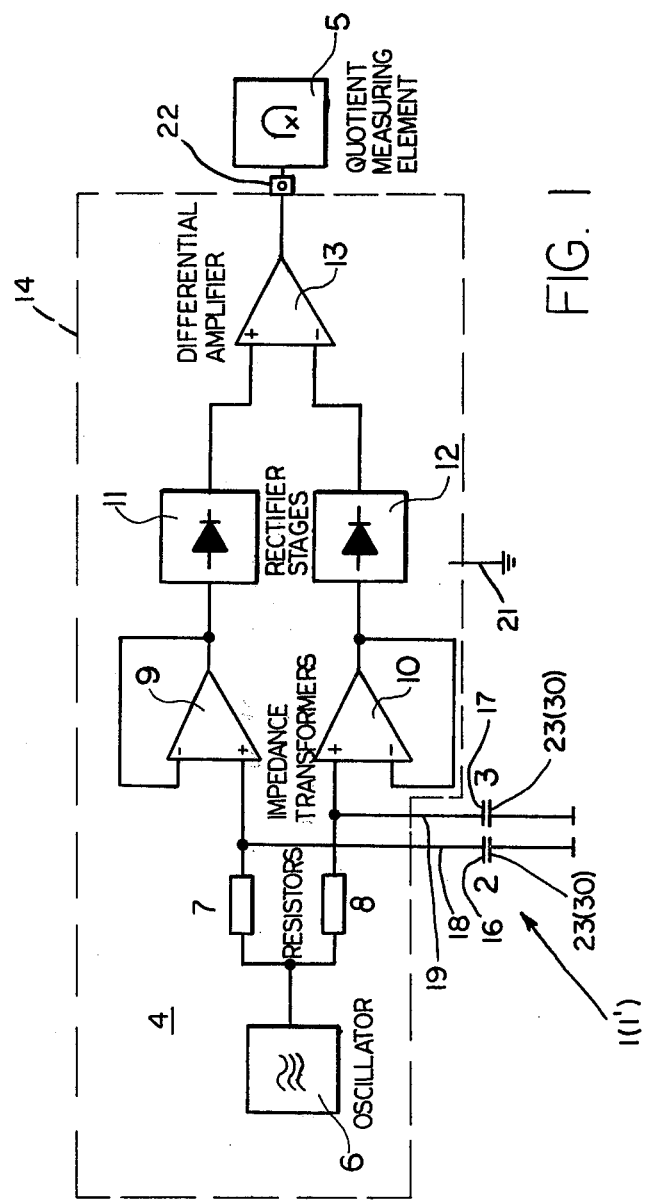
FIG. 1 is a block circuit diagram of the circuitry of the circuit module of the measuring device in accordance with the invention.

Referring now to the drawings, the device for the capacitive level height measurement in accordance with the invention comprises a measuring sensor 1 immersed in the medium to be measured, the measuring sensor containing a measuring capacitor 2 and a reference capacitor 3, an evaluation circuit 4 and a quotient measuring element 5 for indicating of the measuring result.

The evaluation circuit 4 comprises an oscillator 6, the output of which is connected via, each a high-impedance resistor 7 and 8, respectively, with the measuring capacitor 2 and the reference capacitor 3. The two capacitors 2 and 3 are each connected with the two inputs of the differential amplifier 13 each by means of impedence transformer 9 and 10, respectively, and a rectifier stage 11 and 12, respectively. The quotient (meter) movement 5 is connected to the output of the differential amplifier 13. The entire evaluation circuit 4 with the exception of the indicator instrument 5 and the two capacitors 2 and 3 is combined by use of microelectronic technology into a single circuit module or chip 14.

As evident from FIG. 4, this component or circuit chip 14 is seated on an insulating material plate 15, on which plate also there are disposed one of the electrodes 16 of the measuring capacitor 2 and one of the electrodes 17 of the reference capacitor 3. The electrodes 16 and 17 each form a unit with the conductor or feed lines 18 and 19, respectively, which are associated with each of them. In its edge range, the insulating material plate 15 is provided with a contacting track 20 constituting a conducting layer 20, which runs along the two longitudinal sides and the upper wide side and passes into a feed line set-off or connection 21. On the insulating material plate 15, moreover, a solder connection surface 22 there is provided for the feed line to the indicator instrument 5. The electrodes and the feed lines on the insulating material plate 15 are produced together in an advantageous manner in a single working step, in the manner that surfaces which are not required are etched out from a metal layer or film applied on the insulating material plate 15, particularly a copper layer or film. The measuring electrode 16 thereby can be produced in every conceivable surface-shape, and consequently the characteristic curve of the measuring sensor can be adjusted within wide limits to the requirements called for by the different forms and shapes of the liquid container or tank, the liquid level of which is to be measured.

The other electrodes of the measuring capacitor 2 and of the reference capacitor 3 are combined into a joint or common electrode in the shape of two sheet metal strips 23 and 24, the cross-section of each of which is U-shaped and the free leg ends 25 and 26 of which, respectively, are connected with one another by means of the flanges of two edges, the flanges receiving the insulating material plate 15 therebetween. Both sheet metal strips 23 and 24 are fastened on the built-in flange 27 and serve as a carrier for the insulating material plate 15. After the assembly of the measuring sensor 1, one of the two sheet metal strips 23 and 24 respectively (with the illustrated embodiment this is sheet metal strip 23) with its bent leg ends, contacts the contacting track 20, the latter running around on the insulating material plate 15, whereby there is guaranteed an unobjectionable electrical connection of this measuring- and reference-electrode with the chip 14.

Two sheet metal strips of U-shaped profile can be produced with the same tool from strips of different widths.

For damping of the fluctuations or oscillations of the medium in the measuring sensor 1, there is formed or attached on the sheet metal strip 23, a perpendicularly bent-off tab 28, the length of which is slightly shorter than the narrow side of the tube-shaped carrier, the latter being made of the sheet metal strips 23 and 24. In this manner one obtains a throttle location or opening 29 between the inner space or interior of the measuring sensor 1 and the outer space or exterior (i.e., in the vehicle tank) of the measuring sensor.

In FIG. 5 another embodiment of the measuring sensor in accordance with the invention is illustrated with some of the elements which are similar to those of the prior embodiment having the same but primed numbers. The measuring sensor 1' comprises an insulating material plate 15' which is provided with a conducting layer on both sides and a single U-profile shaped sheet metal strip 30, the latter forming one electrode of the measuring capacitor 2 and of the reference capacitor 3. The other electrode 16' of the measuring capacitor 2 and the other electrode of the reference capacitor 3 are etched out from that side of the metal-lined insulating material plate 15' which side is adjacent to the sheet metal strip 30, while the side of the metal-lined insulating material plate 15' which faces away from the sheet metal strip 30, is not etched and this metal layer 31 forms a screen or cover protection with the sheet metal strip 30. The conducting layer tracks 20' adjacent the edges of the plate 15' are contacted by the U-shaped flange 35 of the free ends of the sheet metal strip 30, the tracks 20' being electrically connected to the evaluation circuit component 14 as in the previous embodiment.

The evaluation circuit 4 is located above the liquid or solids in the tank to be measured when the device according to the invention is mounted in a tank 35 with the flange 27 at the top of the vehicle tank wall and the bottom (28) adjacent the bottom of the vehicle tank wall. With the invention once the curve or shape of the conducting layer 16 is determined for a tank of a vehicle, then the same can be mass produced alike to provide accurate measurement results for all vehicles having the same tank form.

While we have disclosed two embodiments, it is to be understood that these embodiments are given by example only and not in a limiting sense.

We claim:

1. A device located in motor vehicle tanks for the level measurement of liquid in a motor vehicle tank, comprising a capacitive measuring sensor disposed in said tank immersed at least partially in the liquid comprising an elongated insulating material plate with at least one electrode thereon, said insulating material plate having longitudinal edges, a U-profile shaped carrier electrode made of a sheet metal strip, longitudinal ends of said U-profile shaped carrier electrode forming legs thereof fastened to said insulating material plate in the vicinity of said edges, said at least one electrode on said elongated insulating material plate is arranged longitudinally parallel to said carrier electrode, at least one conducting layer in the vicinity of said edges being on said insulating material plate, said at least said one conducting layer facing toward said carrier electrode and being electrically connected with at least one of the legs of said U-shaped carrier electrode by the fastening of said carrier electrode to said insulating material plate in the vicinity of said edges, a circuit chip module including evaluating circuit components having an oscillator, said module being mechanically connected to said insulating material plate of said measuring sensor, an indicator instrument being electrically connected to said evaluating circuit components, said evaluating circuit components being electrically connected to said at least one conducting layer of said insulating material plate and to said at least one electrode.

2. The device according to claim 1, wherein said module is arranged on a side of said insulating material plate which carries said at least one electrode, the latter faces said carrier electrode.

3. The device according to claim 1, further comprising conducting lines extend from said electrodes, said at least one electrode on said insulating material plate and said conducting lines are a part of an etched-out metal layer, said layer is disposed on said insulating material plate.

4. The device according to claim 1, wherein said legs have ends forming flanges, respectively, said flanges each encompass one of said edges of said insulating material plate, respectively, and are each U-shaped engaging said at least one conducting layer on one side of said insulating material plate as well as engaging the other side of said insulating material plate.

5. The device according to claim 1, wherein said carrier electrode comprises two sheet metal strips having U-profiles, respectively, with free leg ends of respective of said two sheet metal strips being connected with one another and receiving said insulating material plate therebetween.

6. The device as set forth in claim 1, wherein said at least one electrode has a non-uniform surface shape along said insulating material plate adjustable to different motor vehicle tank shapes.

7. The device according to claim 1, wherein said sheet metal strip on a bottom end thereof which is immersed in the liquid to be measured has a substantially right-angled bent-off tab spaced from said insulating material plate substantially closing an inner space formed by the insulating material plate and the sheet metal strip defining an inlet opening at the bottom communicating with said inner space and the liquid to be measured.

8. The device according to claim 1, wherein said measuring sensor includes one reference electrode,
said reference electrode constitutes an additional conducting layer on said insulating material plate electrically connected to said evaluating circuit components.

9. The device according to claim 8, wherein said evaluating circuit components include,
two rectifiers,
a differential amplifier having two inputs connected to said rectifiers, respectively,
said reference electrode and said carrier electrode form a reference capacitor,
said at least one electrode and said carrier electrode form a measuring sensor capacitor,
said measuring sensor capacitor and said reference capacitor are connected in parallel to the output of said oscillator and each of said capacitors is connected each by means of one of said rectifiers, respectively, with one of said inputs of the differential amplifier, respectively, coordinated thereto,
said indicator instrument comprises a quotient measuring element connected to the output of said differential amplifier.

10. A device located in and in combination with motor vehicle tanks for the level measurement of liquids in the motor vehicle tanks, comprising
a motor vehicle tank containing liquid,
a capacitive measuring sensor disposed in said tank immersed at least partially in the liquid comprising
an elongated insulating material plate with at least one electrode thereon, said insulating material plate having longitudinal edges,
a U-profile shaped carrier electrode made of a sheet metal strip, longitudinal ends of said U-profile shaped carrier electrode forming legs thereof fastened to said insulating material plate in the vicinity of said edges,
said at least one electrode on said elongated insulating material plate is arranged longitudinally parallel to said carrier electrode,
at least one conducting layer in the vicinity of said edges being on said insulating material plate,
said at least said one conducting layer facing toward said carrier electrode and being electrically connected with at least one of the legs of said U-shaped carrier electrode,
a circuit chip module including evaluating circuit components having an oscillator, said module being mechanically connected to said insulating material plate of said measuring sensor,
an indicator instrument being electrically connected to said evaluating circuit components,
said evaluating circuit components being electrically connected to said at least one conducting layer of said insulating material plate and to said at least one electrode.

* * * * *